United States Patent [19]

Pedneau et al.

[11] Patent Number: 5,682,310

[45] Date of Patent: Oct. 28, 1997

[54] COMPUTER SYSTEM INCLUDING IN-CIRCUIT EMULATION MODE FOR DEBUGGING SYSTEM MANAGEMENT SOFTWARE

[75] Inventors: Michael D. Pedneau, Austin; Hans Magnusson, Buda; Dan S. Mudgett, Austin, all of Tex.

[73] Assignee: Advanced Micro Devices Inc., Sunnyvale, Calif.

[21] Appl. No.: 602,680

[22] Filed: Feb. 16, 1996

Related U.S. Application Data

[63] Continuation of Ser. No. 279,614, Jul. 22, 1994, abandoned.
[51] Int. Cl.$^6$ .............................. G06F 9/44; G06F 11/00
[52] U.S. Cl. .................. 364/280; 395/800; 364/267.91; 364/232.3; 364/927.81
[58] Field of Search ..................... 395/800; 364/280, 364/267.91, 232.3, 927.81

[56] References Cited

U.S. PATENT DOCUMENTS

| | | | |
|---|---|---|---|
| 4,674,089 | 6/1987 | Poret et al. | 371/25 |
| 4,782,461 | 11/1988 | Mick et al. | 364/900 |
| 5,175,853 | 12/1992 | Kardach | 395/650 |
| 5,182,811 | 1/1993 | Sakamura | 395/800 |
| 5,228,039 | 7/1993 | Knoke et al. | 371/19 |
| 5,313,618 | 5/1994 | Pawloski | 395/500 |
| 5,321,828 | 6/1994 | Phillips et al. | 395/500 |
| 5,339,437 | 8/1994 | Yuen | 395/700 |
| 5,357,628 | 10/1994 | Yuen | 395/575 |
| 5,392,420 | 2/1995 | Balmer et al. | 395/500 |
| 5,410,710 | 4/1995 | Sarangdhar et al. | 395/725 |
| 5,437,039 | 7/1995 | Yuen | 395/725 |
| 5,539,901 | 7/1996 | Ramirez | 395/500 |

FOREIGN PATENT DOCUMENTS 0265949  5/1988  European Pat. Off. .

*Primary Examiner*—Ayaz R. Sheikh
*Assistant Examiner*—Valerie Darbe
*Attorney, Agent, or Firm*—Conley, Rose & Tayon; B. Noel Kivlin

[57] ABSTRACT

A computer system is provided that includes a microprocessor core having an ICE interrupt line to support an in-circuit emulation mode of the computer system. An interrupt control unit coupled to the ICE interrupt line of the microprocessor core, controls a memory control unit in accordance with assertions of an external "debug" interrupt signal and an external SMM (system management mode) interrupt signal. During normal operation, the microprocessor core executes code out of a "normal" memory region of a system memory coupled to the memory control unit. If the debug interrupt signal is asserted while the microprocessor core is operating in normal mode, the interrupt control unit responsively asserts the ICE interrupt signal to the microprocessor core, causing the microprocessor core to read an ICE vector from the system memory and to thereafter execute ICE code. If the SMM interrupt signal is asserted while the microprocessor core is operating in normal mode, the interrupt control unit again causes assertion of the ICE interrupt signal. The microprocessor core responsively requests the ICE vector and, the interrupt control unit causes the memory control unit to translate the requested address to a second memory location of the system memory at which an SMM vector is stored. The computer system allows an in-circuit emulation mode to be entered while the microprocessor core is executing out of the system management space by asserting the debug interrupt signal.

20 Claims, 4 Drawing Sheets

COMPUTER SYSTEM INCLUDING IN-CIRCUIT EMULATION MODE FOR DEBUGGING SYSTEM MANAGEMENT SOFTWARE

This application is a continuation of application Ser. No. 08/279,614, filed Jul. 22, 1994, now abandoned.

BACKGROUND OF THE INVENTION

1. Field of the invention

This invention relates to computer systems and more particularly to mechanisms and techniques for supporting in circuit emulation.

2. Description of the Relevant Art

The heart of a computer system is the microprocessor. As microprocessors have evolved over recent years, they have been designed to support an increasing number of functions, such as multitasking, special graphics processing, enhanced math functions, and power management.

Enhancements in the capabilities of microprocessors have permitted software programmers to generate more sophisticated software programs and have allowed efficient and versatile control of the execution of software programs. However, as the sophistication and complexity of software has increased, it has become more difficult to design software code free from defects or "bugs." The ability to debug software efficiently is a desirable step in the development of a software product.

Many computer systems have therefore been configured with mechanisms which allow software programmers to debug software. For example, microprocessors such as the particularly popular model 80486 microprocessor are designed with features which allow the software programmer to interrogate, analyze and control the microprocessor while it is executing software code. One such feature typically supported within model 80486-based systems is known as in-circuit emulation mode or ICE mode.

FIG. 1 is a block diagram illustrating a typical computer system 100 that supports in-circuit emulation mode. The computer system 100 includes a memory control unit (MCU) 102 coupled to a microprocessor (CPU) 104 and to a random access memory unit 106.

The in-circuit emulation mode of computer system 100 may be initiated while the microprocessor 104 is operating in a normal mode (during which software code is executed out of normal memory space). The in-circuit emulation mode is initiated by microprocessor 104 in response to an ICE interrupt signal at line 108. As will be appreciated by those of skill in the art, the ICE interrupt signal may be asserted by an external source (not shown). Upon assertion of the ICE interrupt signal, the microprocessor 104 transitions to an in-circuit emulation (ICE) mode and begins processing what is referred to as ICE code. During the ICE mode, microprocessor 104 asserts an ICE address strobe (ICEADS) during memory accesses rather than the normal address strobe signal ADS. It is noted that this allows, if desired, the ICE code to be stored within a bank of memory which is completely separated from the normal memory space. For the embodiment shown, the starting memory location 110 of the ICE code is pointed to by an ICE vector which is stored at a predetermined memory location 112 of memory unit 106. In response to assertion of the ICE interrupt signal, the microprocessor 104 reads the ICE vector and jumps to the memory location indicated by the ICE vector. At this point, the microprocessor 104 begins executing the ICE code. An initial portion of the instructions comprising the ICE code causes the microprocessor 104 to store the current state of various registers, flags and other parameters collectively referred to as "state information" associated with the microprocessor 104. By saving this state information, the user may subsequently inspect the memory locations into which the state information was saved and thereby determine the internal status of the microprocessor when the ICE interrupt was asserted. The ICE code may be tailored by the system programmer to support a variety of interrogation functions. Such interrogation functions can greatly aid the programmer in debugging software by allowing, for example, the programmer to single-step the code and examine the state of the various registers and memory space. The last instruction of the ICE code is typically a Return instruction that causes the microprocessor to return back to the state it was in when the ICE interrupt was initially asserted. The saved state information allows the microprocessor 104 to return to normal operation at the conclusion of the ICE procedure since the state information can be restored within the various CPU registers and flag locations where it originally resided. The state information is restored just prior to execution of the Return instruction. Upon execution of the Return instruction microprocessor reverts back to the state it was in when the ICE interrupt was initially asserted.

The ICE interrupt is also frequently utilized within computer systems to perform routine system management functions such as power management. A programmer may store system management code within the ICE memory space of the computer system to attain efficient processing of system management functions. However, the use of ICE interrupts for system management functions has led to difficulties in designing system management software code since the in-circuit emulation mode cannot be entered while the system management code is executing. This has presented a particular problem within computer systems that employ relatively complex system management software.

SUMMARY OF THE INVENTION

The problems outlined above are in large part solved by a microprocessor and computer system including an in-circuit emulation mode for debugging system management software in accordance with the present invention. In one embodiment, the computer system includes a microprocessor core having an ICE interrupt line to support an in-circuit emulation mode of the computer system. In other words, the ICE interrupt line accommodates an ICE interrupt signal which selectively causes the microprocessor core to begin execution of ICE code. An interrupt control unit is coupled to the ICE interrupt line of the microprocessor core, and controls a memory control unit in accordance with assertions of an external "debug" interrupt signal and an external SMM (system management mode) interrupt signal. During normal operation, the microprocessor core executes code out of a "normal" memory region of a system memory coupled to the memory control unit. If the debug interrupt signal is asserted while the microprocessor core is operating in its normal mode, the interrupt control unit responsively asserts the ICE interrupt signal to the microprocessor core. This causes the processor core to read an ICE vector from the system memory and to thereafter execute ICE code. A second region within the system memory is allocated for system management code. If the SMM interrupt signal is asserted while the microprocessor core is operating in normal mode, the interrupt control unit again causes assertion of the ICE interrupt signal. The microprocessor core responsively requests the ICE vector. In this mode, however, the interrupt control unit causes the memory control unit to translate the requested address to a second memory location of the system memory at which an SMM vector is stored. The SMM vector indicates the starting address of the SMM code. Thus, when the microprocessor core receives the SMM vector, it begins execution of the system management code. The computer system allows an in-circuit emulation mode to be entered while the microprocessor core is executing out of the system management space of the system memory by asserting the debug interrupt signal. When the debug interrupt signal is asserted while the microprocessor core is executing the system management code, the interrupt control unit again asserts the ICE signal to the microprocessor core. The microprocessor core subsequently retrieves the ICE vector through the memory control unit, and begins executing the ICE code. Upon completion of the ICE code, the microprocessor core returns to the point within the system management code where it was executing at the time the debug interrupt signal was asserted. The computer system advantageously allows in-circuit emulation of system management code while maintaining efficient processing of system management functions.

Broadly speaking, the invention contemplates a computer system comprising a processor core including an interrupt input line and an interrupt control unit coupled to the interrupt input line. The interrupt control unit is capable of receiving a debug interrupt signal and an SMM interrupt signal wherein a current state of the interrupt control unit depends upon assertions of the debug interrupt signal and the SMM interrupt signal, and wherein the interrupt control unit is capable of generating a memory mode signal on the memory mode line which is indicative of the current state of the interrupt control unit. The interrupt control unit is further capable of selectively asserting an ICE interrupt signal on the interrupt input line in response to assertions of the debug interrupt signal and SMM interrupt signal. The computer system further includes a random access memory and a memory control unit coupled to the processor core and to the memory mode line, wherein the memory control unit is capable of receiving an address signal from the processor core, and wherein the memory control unit is capable of mapping the address signal to a first physical location of the random access memory when the memory mode signal is a first state and to a second physical location of the random access memory when the memory mode signal is in a second state.

BRIEF DESCRIPTION OF THE DRAWINGS

Other objects and advantages of the invention will become apparent upon reading the following detailed description and upon reference to the accompanying drawings in which.

Figure 1:
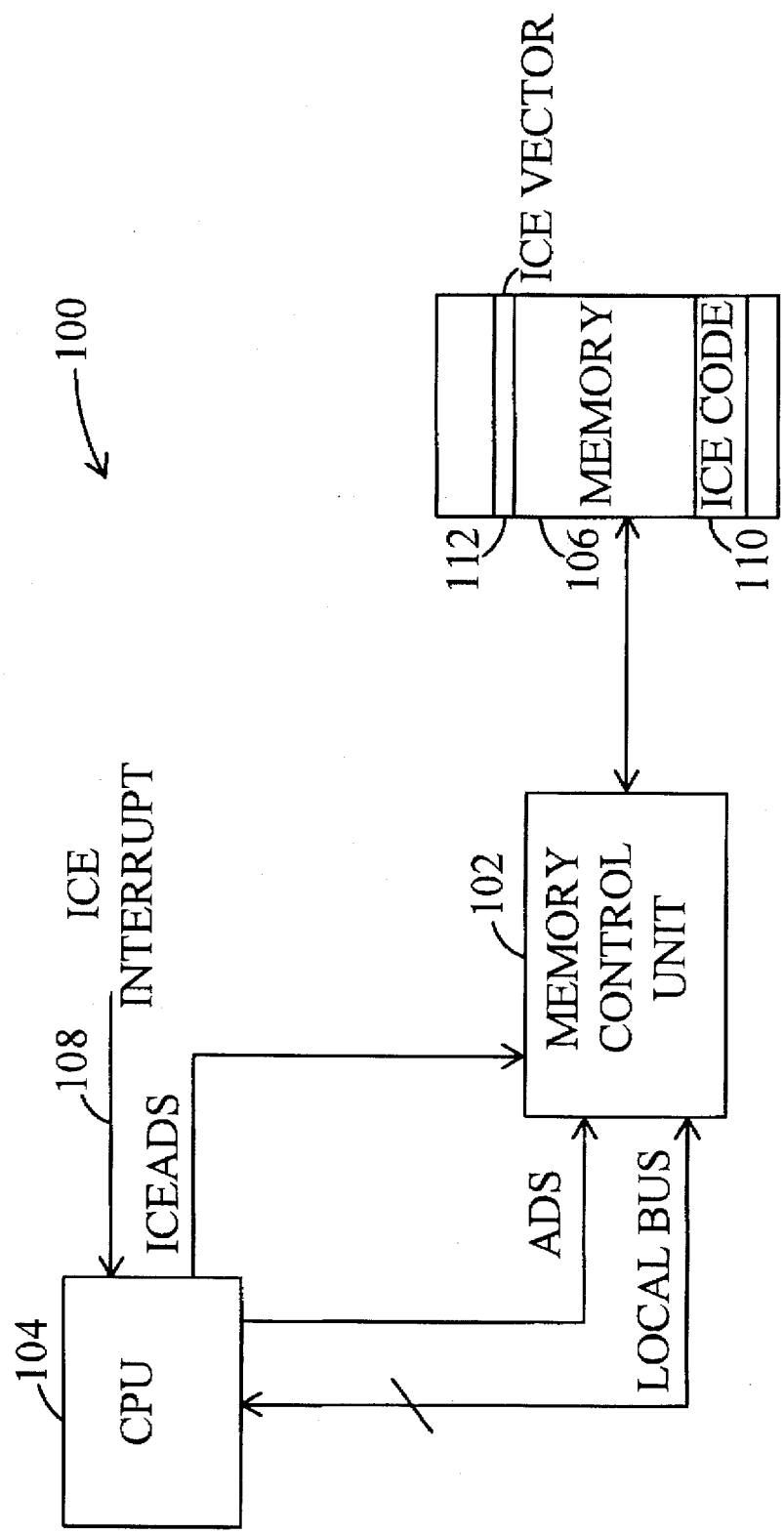
FIG. 1 is a block diagram which illustrates a typical computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 2:
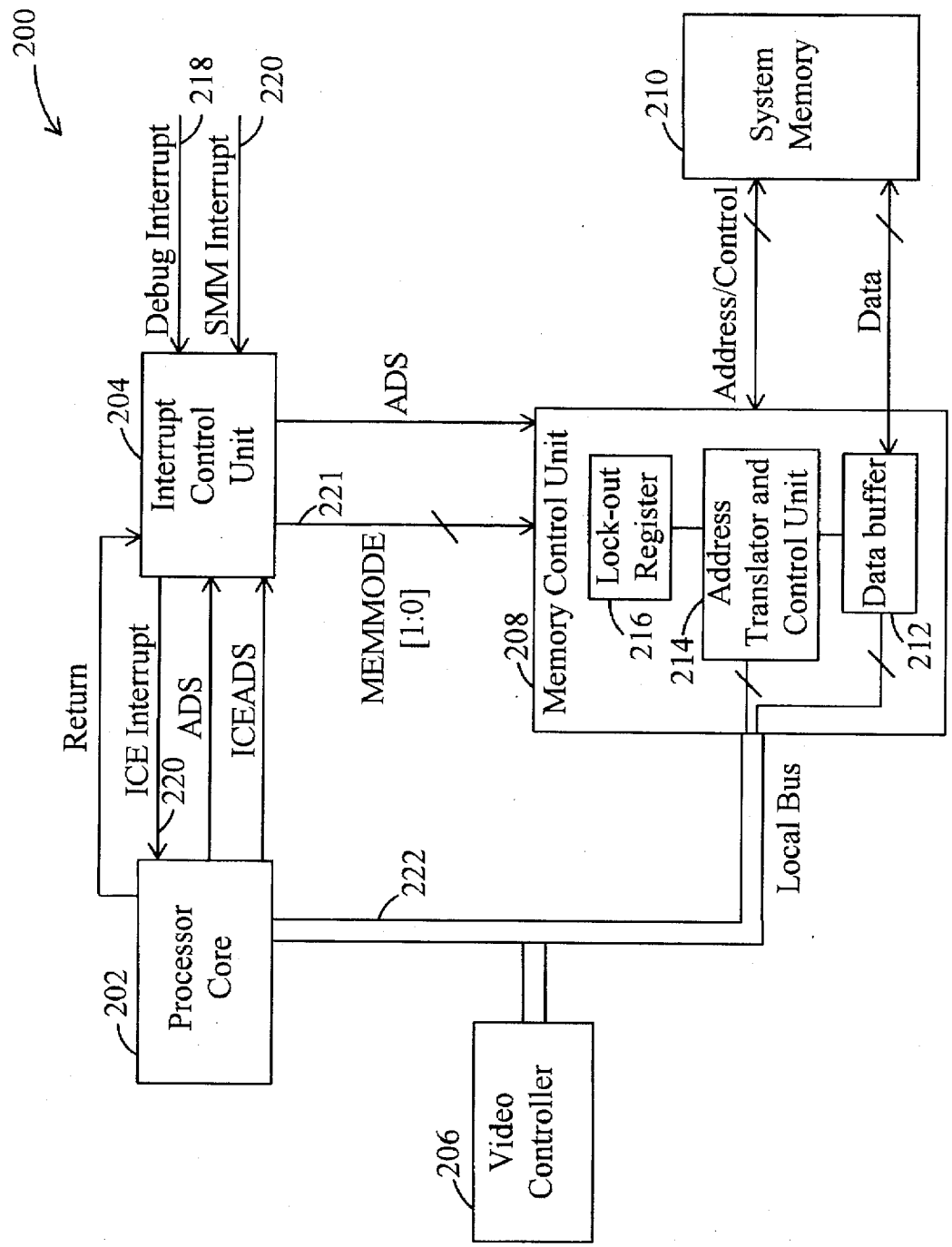
FIG. 2 is a block diagram of a computer system including an interrupt control unit according to the present invention.

Referring next to FIG. 2, a block diagram of a computer system 200 according to the present invention is shown. Computer system 200 includes a processor core 202 coupled to an interrupt control unit 204, a video controller 206, and a memory control unit 208. A system memory 210 is further shown coupled to memory control unit 208. In its illustrated form, memory control unit 208 includes a data buffer 212, an address translator and control unit 214, and a lock-out register 216.

Processor core 202 is illustrative of, for example, a model 80486 microprocessor core. System memory 210 is illustrative of a memory system comprised of, for example, dynamic RAM. Video controller 206 is a conventional video controller which receives data from processor core 202 and correspondingly drives a video display device (not shown). Generally speaking, memory control unit 208 controls and orchestrates the transfer of data between system memory 210 and CPU local bus 222. Specific details regarding memory control unit 208 will be provided further below.

Interrupt control unit 204 is provided for controlling the assertion of an ICE interrupt signal at an input terminal 220 of processor core 202 and to control the operational state of memory control unit 208, as will be discussed in detail below. As will be readily apparent to those of skill in the art and as explained previously, assertion of the ICE interrupt signal at line 220 causes microprocessor 202 to read an the ICE vector having a predetermined address in system memory 210. The ICE vector points to an address of an ICE interrupt service routine. An initial portion of the instructions comprising the ICE code causes the processor core 202 to store the current state of various registers, flags and other parameters (associated with the processor core 202). Another portion of the ICE code is tailored by the system programmer to support a variety of interrogation functions to allow, for example, the programmer to single-step the code and examine the state of the various registers and memory space. The last instruction of the ICE code is a Return instruction that causes the processor core 202 to return back to the state it was in when the ICE interrupt was initially asserted. The saved state information allows the processor core 202 to return to normal operation at the conclusion of the ICE procedure since the state information is restored within the various CPU registers and flag locations just prior to execution of the Return instruction.

Memory control unit 208 controls and orchestrates the transfer of data between system memory 210 and processor core 202 depending upon a 2-bit memory mode signal labelled MEMMODE [1:0]. As will be better understood below, depending upon the state of interrupt control unit 204, computer system 200 operates in either a "normal" mode, a "system management" mode, a "debug" mode, or a "debug SMM" mode. Each of these modes will be explained in detail below. Memory space accessed by memory control unit 208 while in normal mode is referred generally to as "normal memory space."

The data buffer 212 provides a temporary storage area for data transferring between CPU local bus 222 and system memory 210. In general, the address translator and control unit 214 translates address signals from CPU local bus 222 and provides corresponding address signals to system memory 210. Address translator and control unit 214 further provides timing and control signals associated with CPU local bus 222 and system memory 210 to effectuate desired data transfers, in accordance with conventional techniques. These timing and control signals are dependant upon the specific protocols employed within computer system 200, and the generation of such is well known for a variety of different systems. The function of lock-out register 216 will be discussed further below.

Figure 3:
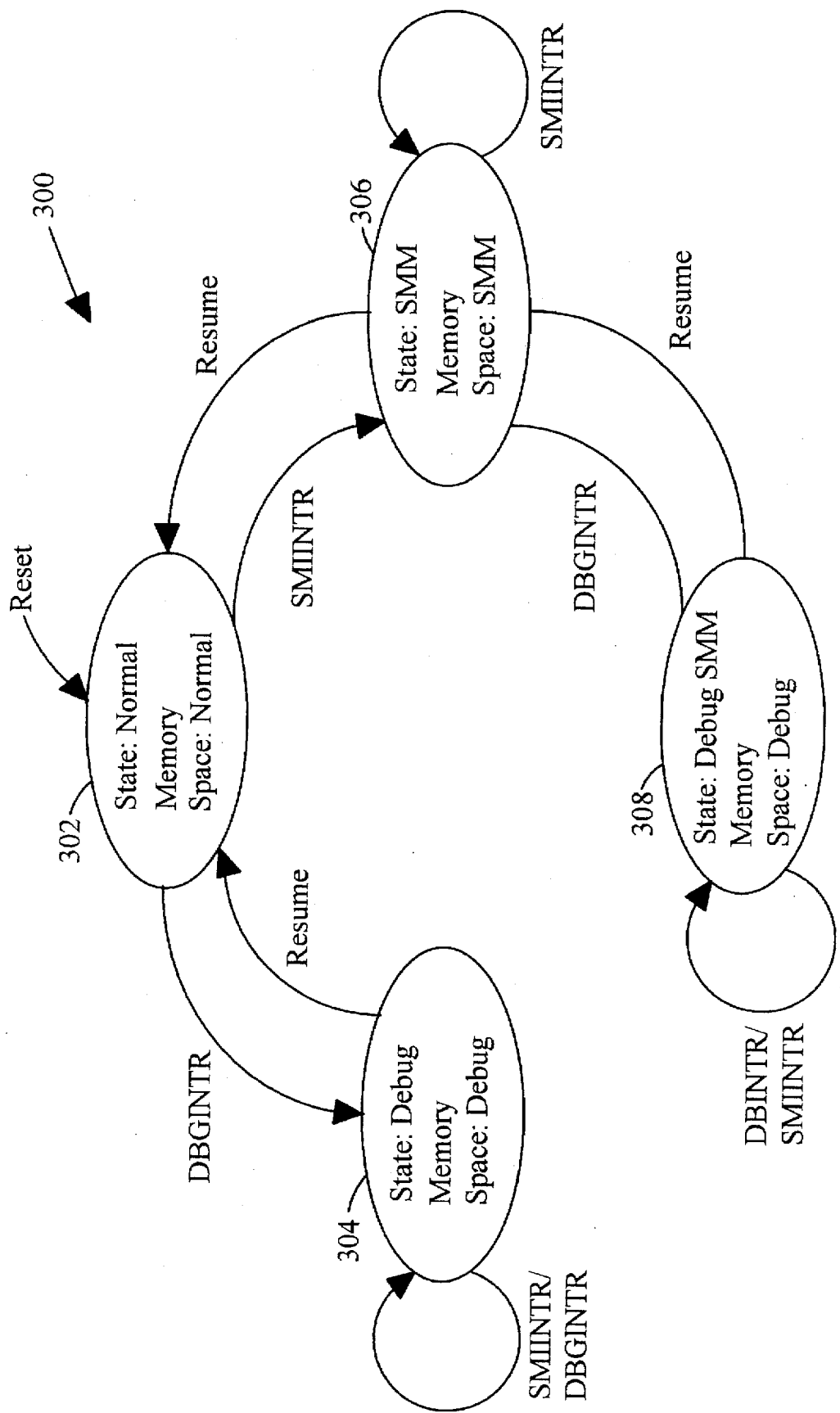
FIG. 3 is a state transition diagram illustrating the operating states and transitions of states in the interrupt control unit.

The operation of interrupt control unit 204 will first be considered. Referring to FIG. 3, a state transition diagram 300 that illustrates the operational states of interrupt control unit 204 is shown. The state transition diagram 300 of FIG. 3 illustrates the various states of interrupt control unit 204 as well as its response to selective assertions of the "debug interrupt" signal and the "SMM interrupt" signal. As illustrated by the state transition diagram, the interrupt control unit 204 includes a normal state 302, a debug state 304, an SMM state 306, and a debug SMM state 308.

The debug interrupt (DBGINTR) and the SMM interrupt (SMIINTR) may be asserted by any source, such as a test unit and an external power management unit, respectively. Referring collectively to FIGS. 2 and 3, upon system reset, the interrupt control unit 204 enters state 302. State 302 represents a normal mode of operation of computer system 200 during which processor core 202 is operating in a normal mode. During the normal mode, if processor core 202 executes an instruction that requires access to system memory 210, the address translator and control unit 214 directly maps addresses from CPU local bus 222 to corresponding addresses of system memory 210 such that the "normal memory space" of system memory 210 is accessed (as will be illustrated below). As such, the operating system as well as desired application programs may be executed in a conventional manner. It is understood that although direct mapping is employed by memory control unit 208 during the normal mode of operation, any type of memory remapping or indexing scheme may be implemented by memory control unit 208 to access the normal memory space. Further details regarding the mapping of memory space within computer system 200 are provided below.

During state 302, interrupt control unit 204 detects assertions of both the debug interrupt and the SMM interrupt. An assertion of the debug interrupt signal causes the interrupt control unit 204 to transition from state 302 to state 304. State 304 is referred to as the debug mode of computer system 200. This state allows the user to debug software executing out of the normal memory space of computer system 200. It is noted that in this embodiment, interrupt control unit 204 asserts an address strobe signal ADS to memory control unit 208 in response to assertions of either the ICEADS signal or the ADS signal from processor core 202. When interrupt control unit 204 transitions to state 304, the ICE interrupt signal to processor core 202 is asserted by control unit 204, which causes the processor core 202 to enter its in-circuit emulation (ICE) mode as reflected by the MEMMODE signal. As stated previously, in response to an assertion of the ICE interrupt, the processor core 202 reads the "ICE vector" to determine the starting address location of the ICE code within system memory 210 of which the processor core 202 must subsequently execute out of. Those of skill in the art will appreciate that processor core 202 reads the "ICE vector" at a predesignated memory location with system memory 210. The memory mode signal MEMMODE[1:0] is driven by interrupt control unit 204 during state 304 to indicate to the memory control unit 208 that the current state is the "debug" mode. This causes the address translator and control unit 214 to translate (either directly or indirectly) the address of the "ICE vector" driven on the address lines of local bus 222 (by processor core 202) to a value (referred to as the "debug vector") of a predetermined memory location of system memory 210 which contains the starting address location of what will be generally referred to as the debug memory space of system memory 210. The debug memory space contains in-circuit emulation code to allow a programmer to interrogate the status of the processor core 202. Upon reading the address of the starting location of the "debug" space, processor core 202 begins execution of the debug code. The debug space of system memory 210 will be described in greater detail below. Upon execution of a resume (or Return) command, a control signal labelled "Return" is generated by processor core 202 which causes the interrupt control unit 204 to transition back to state 302 from state 304. It will be appreciated that a resume command is typically provided at the end of the debug code. It is also noted that during state 304, the interrupt control unit masks (does not respond to) assertions of either the debug interrupt or the SMM interrupt.

During state 302, an assertion of the SMM interrupt signal causes the interrupt control unit 204 to transition from state 302 to state 306. State 306 is referred to as a system management mode of operation of computer system 200. This state is provided to service system management functions, such as power management functions, through execution of dedicated system management software. Similar to transitions to state 304, when interrupt control unit 204 transitions to state 306, the ICE interrupt signal to processor core 202 is asserted by interrupt control unit 204. This again causes processor core 202 to enter its in-circuit emulation (ICE) mode whereby it requests the ICE vector in a manner described previously. The operation of processor core at this point is identical to that described previously with respect to transitions to state 304. However, during state 306, the memory mode signal MEMMODE[1:0] from interrupt control unit 204 indicates to memory control unit 208 that the computer system 200 is now in the system management mode of operation. This causes the address translator and control unit 214 to translate the address of the ICE vector provided on the address lines of local bus 222 by processor core 202 to a value of a predetermined address of system memory 210 which indicates the starting address of what is referred to as the system management space of system memory 226. This starting address is referred to herein as the SMM vector. The system management space of system memory 226 contains system management routines that perform functions such as power management. Thus, when the SMM interrupt is asserted, the processor core 202 reads the SMM vector which thereby causes the starting address of the system management memory code to be provided to processor core 202. The processor core 202 thereafter executes the dedicated system management routines. Upon execution of a resume command, the interrupt control unit 204 returns from state 306 to state 302. It is noted that prior to execution of a resume command, a portion of the instructions within the system management space causes the state of the processor core 202 to be restored in the state it was in just prior to assertion of the SMM interrupt signal. It is also noted that only those registers and/flags that are modified during execution of the system management routines need to be saved upon initiation of the system management mode and restored within the processor core 202 upon completion of the system management mode.

When computer system 200 is in state 306, the debug interrupt signal may be asserted to cause the interrupt control unit 204 to transition from state 306 to state 308. It is noted that the SMM interrupt signal is masked during state 306. State 308 is referred to as a "debug SMM mode" of operation of the computer system 200. This state accommodates the debugging of the system management code executing out of the system management memory space of system memory 210. When interrupt control unit 204 enters state 308, the ICE interrupt signal at line 220 to processor core 202 is again asserted by interrupt control unit, thus causing the processor core to again request the ICE vector. The interrupt control unit 204 further drives the memory mode signal MEMMODE[1:0] to indicate that the computer system 200 is currently in the debug SMM mode. When the processor core 202 reads the ICE vector, the address translator and control unit 214 causes the address of the starting location of the debug memory space to be read by processor core 202 (i.e., the same value read during state 304 is read during state 308 to determine the starting address of the debug memory space). Processor core 202 thereafter executes the debug code residing within the debug memory space. This allows a user to debug the system management software via in-circuit emulation mode. Upon an assertion of a resume command, the interrupt control unit 204 returns from state 308 to state 306, and thereafter continues execution of the system management code at the point where it left off when the debug interrupt signal was asserted. It is noted that during state 308 both the debug interrupt and the SMM interrupt are masked.

To summarize the above, upon system reset or system start-up, the interrupt control unit 204 enters state 302. Upon assertion of the debug interrupt signal on line 218, or a SMM interrupt signal on line 220, the interrupt control unit 204 may transition to state 304 or 306 in accordance with the state transition diagram of FIG. 3. State 308 may be similarly entered during state 306 by asserting the debug interrupt. Upon state transition, the interrupt control unit 204 asserts the ICE interrupt signal at line 220. The ICE interrupt signal causes microprocessor 202 to read the interrupt vector and jump to either debug memory space or system management mode space in accordance with either the debug vector or the SMM vector. The interrupt control unit 204 generates a memory mode signal MEMMODE[1:0] on line 221 which is indicative of the current state of the four possible states of the interrupt control unit 204. The memory control unit 208 uses the memory mode signal to control address translations and thus determine what memory space is active for the microprocessor 204 (i.e.,"normal memory space," "SMM memory space," or "debug memory space").

Figure 4:
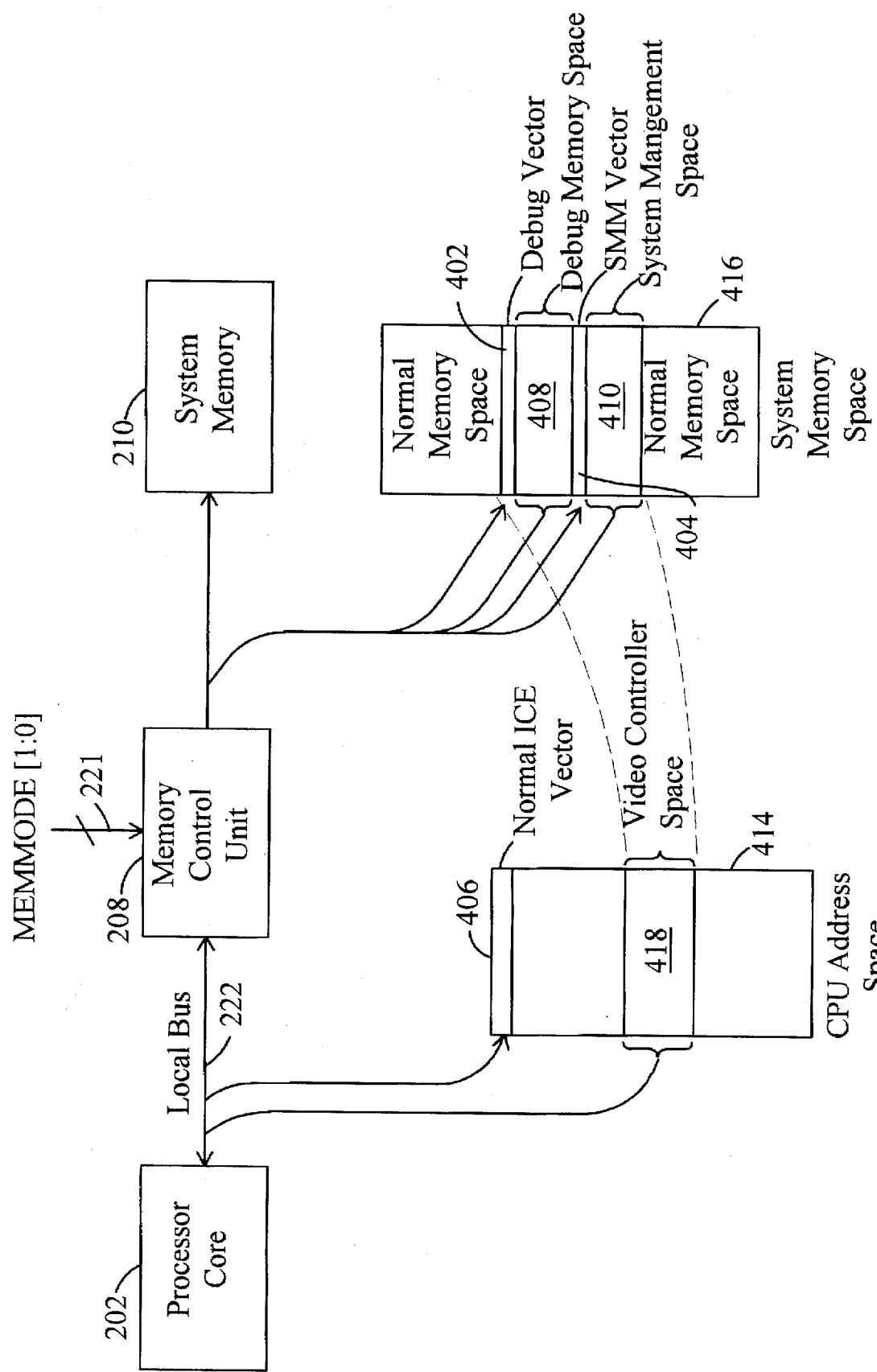
FIG. 4 is a block diagram illustrating the mapping of the ICE code and the SMM code into the normal ICE memory location.

Referring next to FIG. 4 a block diagram is shown that illustrates the mapping of a debug vector 402, an SMM vector 404, a debug memory space 408, and a system management space 410. In the preferred embodiment, each of these memory regions is located within the addressable space of computer system 200 that is reserved for video controller 206. Circuit portions that correspond to those of FIG. 2 are numbered identically.

A processor memory map 414 depicts system memory space as viewed by the processor core 202. System memory map 416 depicts actual memory space in the system memory 210. During normal operation of the computer system 200, when the processor core 202 writes to a memory location in the video address space 418, the memory control unit 208 will not respond. Instead, the video control unit 206 claims the cycle and thus drives the video in accordance with the received data. It will be appreciated by those skilled in the art that a region of a system memory that corresponds to the reserved video controller space within conventional systems is typically unused and is thus wasted.

Referring collectively to FIGS. 2–4, during the operation of the computer system 200, the processor core 202 will write and read information to and from the system memory 210. As stated previously, memory control unit 208 coordinates these reads and writes between the microprocessor 202 and the system memory unit 210. The memory control unit 208 accesses one of three memory spaces based upon the memory mode signal MEMMODE[1:0] at line 221. As stated previously, these three memory spaces are referred to as "normal memory space," "SMM memory space," and "debug memory space."

When the processor core 202 is accessing normal memory space, the memory control unit translates (directly or indirectly) local bus addresses to system memory addresses. However, as noted above, when the processor core 202 requests access to the video address space, the memory control unit 208 does not respond.

When the processor core 202 enters the debug mode of operation in response to assertion of the debug interrupt signal, the processor core 202 performs a read operation to read the value of the normal ICE vector 406. Since the MEMMODE[1:0] signal indicates to the memory control unit 208 that the current state is the debug state, the memory control unit 208 translates the address signal on local bus 222 to the address of the debug vector 402. The memory control unit 208 consequently returns the debug vector 402 via the CPU local bus 222 to processor core 202. At this point, the processor core 202 begins executing out of the debug memory space 408 of system memory 210. It is noted that although the address values driven on the CPU local bus 222 when the debug memory space 408 is being accessed corresponds to the same values as the video controller space, during the debug mode of operation the memory control unit 208 claims the cycle, thus preventing the video controller from responding to the cycle. The memory control unit translates the address on the CPU local bus 222 in accordance with the previous discussion to access the code residing within the debug memory space 408.

Operation is similar when the system management state and the debug SMM state are entered. Again, although the system management space 410 is accessed by address values on CPU local bus 222 that correspond to video controller space, the memory control unit 208 claims the cycle during the system management mode, thus preventing the video controller from responding.

The lock-out register 216 of memory control unit 208 is provided as a locking mechanism to prevent the writing of data to the system management space 410 when the computer system is not operating in the system management mode. Upon system reset and boot, the lock-out register 216 is cleared such that the system management routines can be loaded into the system management space 410 from, for example, a BIOS ROM device while the system is in the normal mode. After the system management routines have been loaded within the system management space 410 of system memory 210, the lock-out register 216 is set (i.e., via software programming) such that the system management routines cannot be overwritten during the normal mode. More specifically, during the normal mode, memory accesses to the system management memory space are prevented by the address translator and control unit 214 if the lock-out register 216 has been set by system software. Once the lock-out register 216 is set by system software (presumably after loading the system management routines), it cannot be subsequently reset while the system is in the normal mode. It is noted that the address translator and control unit 214 is further configured such that the debug memory space cannot be accessed during either the normal mode (state 302) or the SMM mode (state 306), regardless of the status of the lock-out register 216. On the other hand, normal memory space can be accessed, during any mode, regardless of the status of lock-out register 216. Similarly, the SMM space can be accessed while operating in the SMM mode (state 306) or the debug SMM mode (state 308), regardless of the lock-out register.

As stated previously, in one embodiment, the debug memory space 408 and the system management space 410 (or portions thereof) are mapped at memory locations which are common to those of video controller 206. To differentiate between accesses to these memory subsystems, a control bit, which may be a predetermined bit of lock-out register 216 or a bit of a separately mapped control register within address translator and control unit 216, is provided to selectively enable accesses to the debug memory space and the system management space rather than to video controller 206. Thus, prior to performing a desired memory access cycle to the debug memory space or the system management space, the system programmer first must set this control bit to allow the accesses. When video access is desired, the system programmer must clear the control bit. It is noted that the register embodying the control bit may be mapped within either the memory or I/O space of the computer system.

Numerous variations and modifications will become apparent to those skilled in the art once the above disclosure is fully appreciated. For example, it is noted that although the normal memory space, the debug memory space, and the system memory space of the computer system are depicted within a common system memory 210, the respective memory spaces may be stored within separately enabled banks of a memory system with an appropriate mechanism to enable and strobe the different banks. In addition, it is noted that interrupt control unit 204 and memory control unit 208 may be embodied as an integral part of the integrated circuit on which processor core 202 is fabricated. It is intended that the following claims be interpreted to embrace all such variations and modifications.

What is claimed is:

1. A computer system comprising:

a processor core including an interrupt line;

an interrupt control unit coupled to said interrupt input line and configured to receive an external debug interrupt signal and an external SMM interrupt signal wherein a current state of said interrupt control unit depends upon assertions of said debug interrupt signal and said SMM interrupt signal, and wherein said interrupt control unit is configured to generate a memory mode signal which is indicative of the current state of said interrupt control unit, and wherein said interrupt control unit is configured to selectively assert a processor interrupt signal on said interrupt input line in response to assertions of said debug interrupt signal and said SMM interrupt signal;

a memory system for storing instructions to be executed by said processor core; and a memory control unit coupled to said processor core, to said memory system and to receive said memory mode signal, wherein said memory control unit is configured to receive an address signal from said processor core, and wherein said memory control unit is configured to map said address signal to a first physical location of said memory system when said memory mode signal is in a first state and to a second physical location of said memory system when said memory mode signal is in a second state;

wherein said processor core is further configured to generate said address signal in response to an assertion of said processor interrupt signal to thereby read a vector of a designated interrupt service routine;

wherein said mapping of said address signal to said first physical location causes said processor core to execute a debug service routine and thereby enter a debug mode, and said mapping of said address signal to said second physical location causes said processor core to execute a system management service routine and thereby enter a system management service mode; and wherein an assertion of said debug interrupt signal while said processor core is in said system management service mode causes said processor core to enter a debug-system management mode, whereby said debug service routine is used to debug said system management service routine.

2. The computer system as recited in claim 1 wherein said interrupt control unit is further configured to drive said memory mode signal in said first state in response to an assertion of said SMM interrupt signal.

3. The computer system as recited in claim 2 wherein said interrupt control unit is further configured to drive said memory mode signal in said second state in response to an assertion of said debug interrupt signal.

4. The computer system as recited in claim 1 wherein said memory control unit includes an address translator circuit coupled to receive said address signal from said processor core and configured to selectively translate said address signal to either said first physical location of said memory system or to said second physical location of said memory system depending upon said memory mode signal.

5. The computer system as recited in claim 1 wherein said interrupt control unit is configured to assert said processor interrupt signal in response to an assertion of said debug interrupt signal while said processor core is executing a system management service routine invoked as a result of a previous assertion of said SMM interrupt signal, and wherein said memory control unit is configured to provide a vector indicative of said first physical location to said processor core in response to said assertion of said debug interrupt signal.

6. The computer system as recited in claim 1 wherein said first physical location of said memory system stores a first vector which points to a starting address of a debug service routine.

7. The computer system as recited in claim 1 wherein said second physical location of said memory system stores a second vector which points to a starting address of a system management service routine.

8. The computer system as recited in claim 7 wherein said system management service routine includes code configured to control power consumption of said computer system.

9. A computer system comprising:

a processor core for executing instructions that form a software program as well as instructions that form interrupt service routines, wherein said processor core includes an interrupt input line for receiving a processor interrupt signal which causes said processor core to interrupt execution of said software program and to effectuate a read operation to a predetermined address to thereby obtain a vector indicative of an address of one of said interrupt service routines to be executed in response to said interrupt signal;

a memory system including a first memory space for storing said software program, a second memory space for storing a debug service routine, and a third memory space for storing a system management service routine;

an interrupt control unit coupled to said interrupt input line of said processor core and configured to receive a debug interrupt signal for requesting initiation of said debug service routine and to receive a system management interrupt signal for requesting initiation of said system management service routine, wherein said interrupt control unit is further configured to assert said processor interrupt signal in response to assertions of either said debug interrupt signal and said system management signal and to generate a memory mode signal having a binary value indicative of whether either a request to initiate said debug service routine is pending or a request to initiate said system management service routine is pending; and a memory control unit coupled to said memory system, to receive said memory mode signal from said interrupt control unit, and to receive said predetermined address from said processor core, wherein said memory control unit is configured to obtain a first vector from a first location of said memory system indicative of a starting address of said debug service routine in response to said read operation of said processor core to said predetermined address if said memory mode signal indicates said request to initiate said debug service routine is pending, and wherein said memory control unit is configured to obtain a second vector from a second location of said memory system indicative of a starting address of said system management service routine in response to said read operation of said processor core to said predetermined address if said memory mode signal indicates said request to initiate said system management service routine is pending;

wherein an assertion of said debug interrupt signal while said processor is executing said system management service routine causes said processor to enter a debug-system management mode, whereby said debug service routine is used to debug said system management service routine.

10. The computer system as recited in claim 9 wherein said interrupt control unit is configured to assert said processor interrupt signal in response to an assertion of said debug interrupt signal while said processor core is executing said system management service routine, and wherein said memory control unit is configured to provide said first vector to said processor core in response to a corresponding read operation to said predetermined address.

11. The computer system as recited in claim 9 wherein said memory control unit includes an address translator circuit coupled to receive said predetermined address from said processor core and configured to selectively translate said predetermined address to either a first address of said memory system containing said first vector or a second address of said memory system containing said second vector depending upon said memory mode signal.

12. The computer system as recited in claim 9 further comprising a video controller coupled to said processor core, wherein said video controller is mapped within an addressable region which is common to said first memory space of said memory system.

13. The computer system as recited in claim 9 further comprising a video controller coupled to said processor core, wherein said video controller is mapped within an addressable region which is common to said second memory space of said memory system.

14. The computer system as recited in claim 9 wherein said system management service routine includes code configured to control power consumption of said computer system.

15. The computer system as recited in claim 9 wherein said debug interrupt signal is generated by an external system resource.

16. The computer system as recited in claim 9 wherein said system management interrupt signal is generated by an external system resource.

17. The computer system as recited in claim 9 wherein said memory control unit provides said first vector to said processor core in response to said read operation if said memory mode signal indicates said request to initiate said debug service routine is pending.

18. The computer system as recited in claim 9 wherein said memory control unit provides said second vector to said processor core in response to said read operation if said memory mode signal indicates said request to initiate said system management service routine is pending.

19. The computer system as recited in claim 9 wherein an assertion of said debug interrupt signal indicates that a request to initiate said debug service routine is pending.

20. A computer system comprising:

a processor core including an interrupt input line for receiving a processor interrupt signal, wherein said processor core is configured to interrupt a normal program execution and to perform a read operation to obtain an interrupt vector indicative of a starting location of a designated interrupt service routine in response to an assertion of said processor interrupt signal;

an interrupt control unit coupled to said interrupt input line and configured to assert said processor interrupt signal in response to assertions of a system management interrupt signal and a debug interrupt signal, and wherein said interrupt control unit is further configured to generate a memory mode signal indicative of whether either said system management interrupt signal or said debug interrupt signal is asserted;

a memory system for storing instructions to be executed by said processor core; and a memory control unit coupled to said processor core, to said memory system, and to said interrupt control unit, wherein said memory control unit is configured to map a predetermined address identified by said read operation to a first physical location of said memory system if said memory mode signal indicates an assertion of said system management interrupt signal is pending and to map said predetermined address to a second physical location of said memory system if said memory mode signal indicates an assertion of said debug interrupt signal is pending;

wherein said mapping of said predetermined address to said first physical location causes said processor core to execute an debug service routine and thereby enter an debug mode, and said mapping of said predetermined address to said second physical location causes said processor core to execute a system management routine and thereby enter a system management service mode; and wherein an assertion of said debug interrupt signal while said processor core is in said system management service mode causes said processor core to enter a debug-system management mode, whereby said debug service routine is used to debug said system management service routine.

\* \* \* \* \*